3,198,837
PROCESS FOR THE PURIFICATION OF METHYL ETHYL KETONE
Jürgen Smidt, Munich-Solln, Hugo Kojer, Munich, Rudolf Rüttinger, Deisenhofen, and Rolf Sieber, Cologne-Longerich, Germany, assignors to Consortium für Elektrochemische Industrie G.m.b.H., Munich, Germany
No Drawing. Filed Dec. 21, 1961, Ser. No. 161,261
Claims priority, application Germany, Dec. 24, 1960, C 23,030
1 Claim. (Cl. 260—593)

The present invention relates to a process for the purification of methyl ethyl ketone which in addition to water and aldehydes also contains chlorination products, especially 3-chlorobutanone-2. Such chlorination products, for example, are contained in methyl ethyl ketone produced by the oxidation of butylene in the presence of platinum metal catalysts containing chlorides in the gas or liquid phase.

It is not possible to remove the impurities indicated in strictly distillative processes. Also, upon treatment with dilute aqueous alkali, either by boiling under reflux or by extractive distillation, it has not been possible to achieve a satisfactory purification. These processes, which have been described with reference to methyl ethyl ketone of other origin and composition, are not suitable for the purification of the methyl ethyl ketone concerned according to the invention.

According to the invention it was found that methyl ethyl ketone containing water and aldehydes as well as chorination products, such as 3-chlorobutanone-2, can be purified by treating the impure methyl ethyl ketone in intimate contact with 20–30% by weight aqueous alkali metal hydroxide at temperatures of 90–150° C. under pressure and after separation of the layers distilling the methyl ethyl ketone from the organic phase. Preferably, the methyl ethyl ketone is subjected to a simple prepurification prior to such treatment, such as, for example, by simple distillation and degasification.

Any alkali metal hydroxide can be employed in the present process. For economic reasons, however, the hydroxides of sodium and potassium are preferred.

Despite the high temperatures and strong alkali employed according to the invention, practically no losses of methyl ethyl ketone are suffered. Such a favorable result was not to be expected in view of methyl ethyl ketone's own tendency to aldol formation which in the presence of aqueous NaOH at room temperature already leads to the formation of small quantities of 3-methyl-heptano1-3-one-5. Prior to treatment with the aqueous alkali metal hydroxide solution it is expedient to remove the major portion of the 3-chlorobutanone-2 and the water content above that of azeotropic composition in the crude ketone by simple distillation. Low boiling compounds, such as acetaldehyde can be removed in a degasification column.

The actual treatment with the alkali is effected in apparatus which provides for intensive mixture of both phases which to a far reaching degree are insoluble in each other. Vessels with especially efficient rapidly running stirrers, mechanical high frequency mixers, flow tubes, mixing pumps and mixing nozzles and the like are suited. The period required for the treatment with the alkali, depending upon the type of mixing apparatus and the temperature employed, can be between about 1 and 30 minutes. The volumetric ratio of crude ketone to aqueous alkai expediently is selected between 2:1 and 1:20. The mixing apparatus is either constructed of or clad with such corrosion resistant materials as Cr–Ni–Mo steels, Hastelloy, titanium, titanium alloys, ceramics, carbon, graphite, polyolefins, polytetrafluoroethylene or alkali resistant synthetic resins.

The alkali treatment not only converts the aldehydes contained in the crude ketones into higher molecular weight compounds but also causes destruction of the chloroketones to such a far reaching degree that they no longer are a detriment in the further purification. A further advantage of the treatment with the concentrated aqueous alkali is that the water content of the crude ketone is reduced considerably thereby. The water still remaining in the crude ketone, about 2–5%, can easily be removed by distillation under normal pressure with low steam requirements. It is possible in this way to avoid costly water removal by distillation under pressure or extractive distillation.

After the alkali treatment the phases are separated All or a part of the separated aqueous alkali phase can be reused after distilling off the water and methyl ethyl ketone taken up during the treatment of the crude methyl ethyl ketone. The organic phase is first dehydrated by distilling off the methyl ethyl ketone-water azeotrope which is recycled to the alkali treatment and then freed of the higher boiling components in a further column The lower portion of the latter column is either constructed as a thin film evaporator or as a normal column in the event that a higher boiling auxiliary liquid is employed to drive off the methyl ethyl ketone. The methyl ethyl ketone thus obtained meets the customary commercial purity requirements. If special requirements must be met, a further more far reaching purification according to known methods can be carried out.

The following examples will serve to illustrate several embodiments of the process according to the invention, all percentages in the examples are by weight.

*Example 1*

A pre-purified methyl ethyl ketone which had been produced according to the process of German Patent 1,049,845 and in addition to 11.8% water and 1.5% butyraldehyde also contained 0.06% of 3-chlorobutanone-2 was intimately mixed with an equal volume of 25% aqueous NaOH at 100° C. under pressure in a vessel provided with an impeller stirrer. After 25 minutes' treatment the stirring was interrupted and the organic phase which separated off over the aqueous alkali layer was drawn off. The methyl ethyl ketone thus obtained is free of chlorobutanone and at the same time its water content had been reduced to 4.5% and the butyraldehyde content to 0.03%. Water was removed from such product by distillation at atmospheric pressure and the methyl ethyl ketone-water azeotrope recovered at the head of the column was recycled to the alkali treatment of a further batch of methyl ethyl ketone. The remaining dehydrated methyl ethyl ketone was then distilled in another column to separate it from the higher boiling components.

*Example 2*

A pre-purified crude ketone obtained in the oxidation of butylene in the presence of platinum metal chloride containing catalysts which in addition to 11.5% of water and 0.46% of butyraldehyde contained 0.2% of 3-chlorobutanone-2 was treated under pressure at 120° C. with 20% aqueous NaOH in a homogenizing apparatus. The volumetric ratio of aqueous NaOH to ketone was 4:1. After 15 minutes' treatment the phases were permitted to separate and the organic phase drawn off. The product was free of chlorobutanone. Its water content had been reduced to 3.7% and its butyraldehyde content to 0.02%. The product was then subjected to the distillation procedure described in Example 1 to separate the water and the higher boiling components.

We claim

A process for purifying methyl ethyl ketone obtained in the oxidation of butylene in the presence of a platinum metal catalyst containing chlorides which in addition to water and aldehydes contains chlorination products as impurities which comprises contacting such methyl ethyl ketone with a 20 to 30% aqueous alkali metal hydroxide, the ratio of such methyl ethyl ketone to aqueous alkali metal hydroxide being 2:1 to 1:20 by volume, at a temperature of 90 to 150° C. under superatmospheric pressure for a period of 1 to 30 minutes, separating off the organic phase and recovering purified methyl ethyl ketone from such organic phase by distillation.

References Cited by the Examiner

UNITED STATES PATENTS 2,429,484  10/47  Peters _____ 260—593 X
2,662,848  12/53  Emerson et al. _____ 260—593 X

FOREIGN PATENTS 817,149  7/59  Great Britain.
878,065  9/61  Great Britain.

LEON ZITVER, *Primary Examiner.*